(12) United States Patent
Takahashi

(10) Patent No.: US 10,121,156 B2
(45) Date of Patent: Nov. 6, 2018

(54) ANALYSIS DEVICE, ANALYSIS PROGRAM, ANALYSIS METHOD, ESTIMATION DEVICE, ESTIMATION PROGRAM, AND ESTIMATION METHOD

(71) Applicant: International Business Machines Corporation, Armonk, NY (US)

(72) Inventor: Rikiya Takahashi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 593 days.

(21) Appl. No.: 14/655,635

(22) PCT Filed: Nov. 19, 2013

(86) PCT No.: PCT/JP2013/081118
§ 371 (c)(1),
(2) Date: Jun. 25, 2015

(87) PCT Pub. No.: WO2014/103560
PCT Pub. Date: Jul. 3, 2014

(65) Prior Publication Data
US 2015/0339680 A1    Nov. 26, 2015

(30) Foreign Application Priority Data
Dec. 25, 2012    (JP) .................................. 2012-281789

(51) Int. Cl.
*G06Q 10/00*        (2012.01)
*G06Q 30/02*        (2012.01)
(Continued)

(52) U.S. Cl.
CPC ......... *G06Q 30/0201* (2013.01); *G06Q 10/06* (2013.01); *G06Q 30/02* (2013.01); *G06F 3/0237* (2013.01); *G06Q 10/063* (2013.01)

(58) Field of Classification Search
CPC ...... G06Q 10/06; G06Q 10/063; G06Q 30/02; G06Q 30/0201; G06F 3/0237
See application file for complete search history.

(56) References Cited

U.S. PATENT DOCUMENTS

| | | | |
|---|---|---|---|
| 6,430,539 B1 | 8/2002 | Lazarus et al. | |
| 6,839,682 B1 | 1/2005 | Blume et al. | |

(Continued)

FOREIGN PATENT DOCUMENTS

| | | | |
|---|---|---|---|
| JP | 2002288295 A2 | 10/2002 | |
| JP | 2003524221 T2 | 8/2003 | |

(Continued)

OTHER PUBLICATIONS

International Preliminary Report on Patentability dated Jun. 30, 2015 along with English language translation.
Search Report from PCT/JP2013/081118.

*Primary Examiner* — Matthew S Gart
*Assistant Examiner* — Stephen S Swartz
(74) *Attorney, Agent, or Firm* — Scully, Scott, Murphy & Presser, P.C.; David Quinn, Esq.

(57) ABSTRACT

An analysis device including a substitution unit for substituting each event in an impulse-like event series with rectangular windows; a dividing unit for dividing the event series timewise at least at one transition point in the rectangular windows; a state vector generation unit for generating a state vector corresponding to the state of the rectangular windows in response to each of the divided time periods; and an analysis unit for performing Poisson regression using the state vectors corresponding to the time periods. A method comprising computer-executable steps is provided that substitutes each event in the inputted event series with rectangular windows; divides the event series timewise at least at one transition point in the rectangular pulses; generates a state vector corresponding to the state of (Continued)

the rectangular pulses in response to each of the divided time periods; and performs a Poisson regression using the state vectors corresponding to the time periods.

14 Claims, 11 Drawing Sheets

(51) Int. Cl.
*G06Q 10/06* (2012.01)
*G06F 3/023* (2006.01)

(56) References Cited

U.S. PATENT DOCUMENTS

| | | | |
|---|---|---|---|
| 6,904,408 B1* | 6/2005 | McCarthy | A61B 5/6815 |
| | | | 705/2 |
| 7,165,037 B2 | 1/2007 | Lazarus et al. | |
| 7,533,038 B2 | 5/2009 | Blume et al. | |
| 2003/0225786 A1 | 12/2003 | Hall et al. | |
| 2005/0159996 A1 | 7/2005 | Lazarus et al. | |
| 2007/0011122 A1 | 1/2007 | Hall et al. | |
| 2007/0244741 A1 | 10/2007 | Blume et al. | |
| 2008/0275800 A1* | 11/2008 | Abe | G06Q 40/00 |
| | | | 705/35 |
| 2008/0290987 A1* | 11/2008 | Li | G06Q 30/02 |
| | | | 340/5.1 |
| 2009/0043719 A1 | 2/2009 | Hall et al. | |
| 2009/0240496 A1 | 9/2009 | Yamamoto et al. | |
| 2010/0049538 A1* | 2/2010 | Frazer | G06Q 30/02 |
| | | | 705/14.4 |
| 2011/0153419 A1* | 6/2011 | Hall, III | G06Q 10/067 |
| | | | 705/14.52 |
| 2013/0006915 A1* | 1/2013 | Gunawardana | G06N 5/02 |
| | | | 706/52 |

FOREIGN PATENT DOCUMENTS

| | | |
|---|---|---|
| JP | 2005236862 A2 | 9/2005 |
| JP | 2009223423 A2 | 10/2009 |
| JP | 2009229899 A2 | 10/2009 |
| JP | 4707797 B2 | 6/2011 |
| JP | 2011199515 A2 | 10/2011 |

* cited by examiner

FIG. 3

| ID (i) | Name | Channel 1 (DM) | Channel 2 (Web Ad) | ... | Channel (o-1) | Channel (o) | Response (Purchases) |
|---|---|---|---|---|---|---|---|
| 1 | YAMADA Taro | 2012/1/24 2012/3/20 | 2012/2/4 2012/3/4 | ... | ... | ... | 2012/2/10 |
| 2 | Sato Ichiro | 2012/1/24 | 2012/2/4 | ... | ... | ... | 2012/1/26, 2012/2/3 |
| 3 | Suzuki Hanako | (None) | 2012/2/4 | ... | ... | ... | (None) |
| ... | ... | ... | ... | ... | ... | ... | ... |

| ID (i) | Name | Weight W1 | Weight W2 | Weight W3 | Weight W4 | |
|---|---|---|---|---|---|---|
| 1 | YAMADA Taro | $W_{11}$ | $W_{12}$ | $W_{13}$ | $W_{14}$ | Weight Vector $w_1 = (W_{11}, W_{12}, W_{13}, W_{14})$ |
| 2 | Sato Ichiro | $W_{21}$ | $W_{22}$ | $W_{23}$ | $W_{24}$ | Weight Vector $w_2 = (W_{21}, W_{22}, W_{23}, W_{24})$ |
| 3 | Suzuki Hanako | $W_{31}$ | $W_{32}$ | $W_{33}$ | $W_{34}$ | Weight Vector $w_3 = (W_{21}, W_{32}, W_{33}, W_{34})$ |
| ... | ... | ... | ... | ... | ... | |

ANALYSIS DEVICE, ANALYSIS PROGRAM, ANALYSIS METHOD, ESTIMATION DEVICE, ESTIMATION PROGRAM, AND ESTIMATION METHOD

CROSS-REFERENCE TO RELATED APPLICATIONS

The present invention relates to and claims the benefit of the filing date of commonly-owned, co-pending PCT Patent Application No. PCT/JP2013/081118, filed Nov. 19, 2013, which further claims the benefit of priority date of commonly-owned, co-pending Japanese Patent Application No. JP 2012-281789, filed on Dec. 25, 2012, the entire contents and disclosure of which is incorporated by reference as if fully set forth herein.

TECHNICAL FIELD

The present invention relates to an analysis device, analysis program, analysis method, estimation device, estimation program, and estimation method.

BACKGROUND ART

The relationship between stimulus events an individual (such as a customer) experiences and a response event by the same individual has been modeled with statistical methods, and computer systems have been developed for simulating the sequence of response events (see, for example, Patent Document 1).

CITATION LIST

Patent Literature

Patent Literature 1 Translation of PCT Application No. 2003-524221

SUMMARY OF INVENTION

Technical Problems

However, when a time axis is discretized using small fixed lengths of time and then events and individual responses are modeled, the amount of calculations increases significantly. Also, a model that takes into account dynamic events cannot be constructed using existing methods such as survival analysis that deals directly with continuous time when stationary covariates are prerequisites.

Solution to Problems

In a first aspect of the present invention, an analysis device, an analysis method used by the analysis device and an analysis program getting a computer to function as the analysis device are provided, the analysis device including: a substitution unit for substituting each event in an impulse-like event series into rectangular windows; a dividing unit for dividing the event series at a change point in which at least one element of the rectangular windows changes; a state vector generation unit for generating a state vector corresponding to the state of the rectangular windows in response to each of the divided time periods; and an analysis unit for performing Poisson regression analysis using the state vectors corresponding to the time periods.

In a second aspect of the present invention, an estimation device, an estimation method used by the estimation device, and an estimation program getting a computer to function as an estimation device are provided, the estimation device estimating a response to an event series on the basis of the results of an analysis performed by the analysis device, and including: a substitution unit for substituting each event in the inputted event series with rectangular windows; a state vector generation unit for generating a state vector corresponding to the state of the rectangular windows in response to each of the time periods; and an estimation unit for estimating the response frequency indicating the number of responses corresponding to each of the time periods from the state vectors corresponding to each of the time periods using the results of the analysis performed by the analysis device.

This summary of the present invention is not intended to enumerate all of the required characteristics of the present invention. The present invention may be realized by any combination or sub-combination of these characteristics.

BRIEF DESCRIPTION OF DRAWINGS

FIG. 3 is an example of a history of events inputted by a substitution unit 102.

FIG. 9 shows an example of weight vectors $w_{1-m}$ stored in a storage unit 116.

DESCRIPTION OF EMBODIMENT

The following is an explanation of the present invention with reference to an embodiment of the present invention. However, the present embodiment does not limit the present invention in the scope of the claims. Also, all combinations of characteristics explained in the embodiment are not necessarily required in the technical solution of the present invention.

Figure 1:
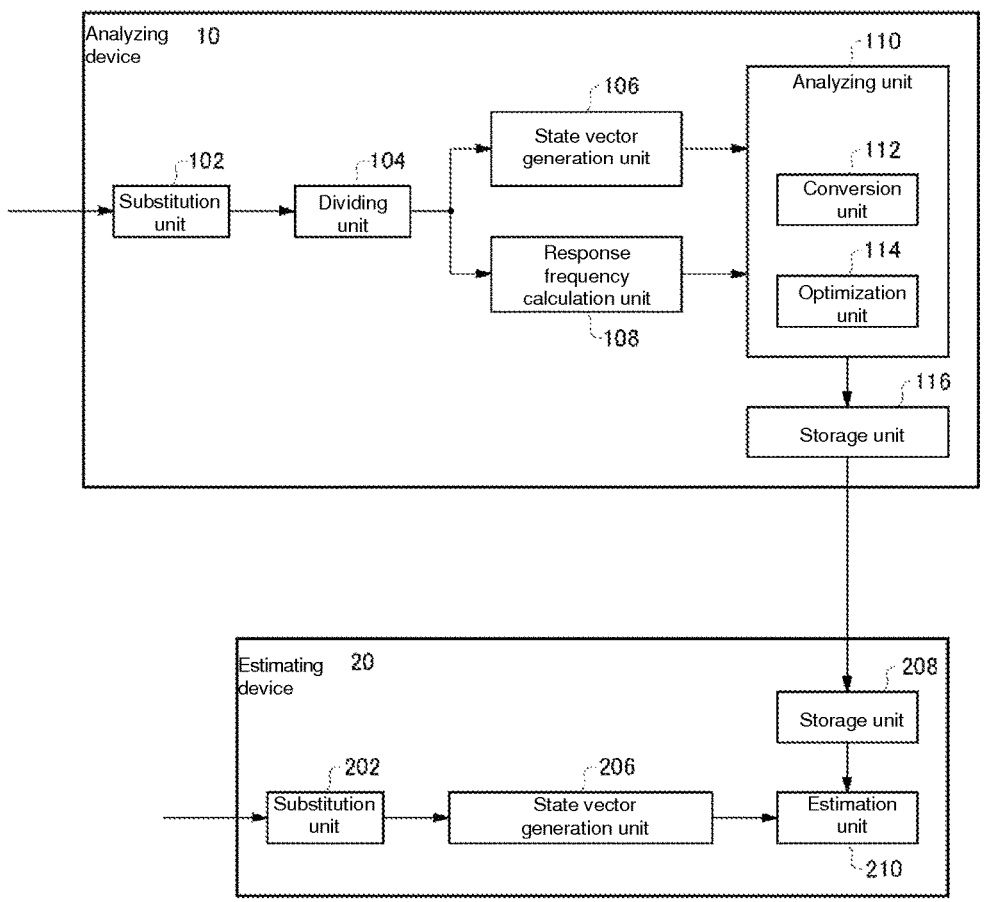
FIG. 1 shows the configuration of the analysis device 10 and the estimation device 20 in an embodiment of the present invention.

FIG. 1 shows a configuration of the analysis device 10 and the estimation device 20 in the present embodiment. The analysis device 10 analyzes a history in which impulse-like events for individuals and individual responses to the events have been recorded. For example, the analysis device 10 analyzes a history of events which records advertising with product campaign information to hundreds of thousands to tens of million people (impulse-like events to individuals) and each customer purchasing the product (individual responses). The analysis device 10 includes a substitution unit 102, a dividing unit 104, a state vector generation unit 106, a response frequency calculating unit 108, an analysis unit 110, and a storage unit 116.

The substitution unit 102 substitutes each event in an impulse-like event series with rectangular windows. In this way, the substitution unit 102 can approximate a response function corresponding to events and individuals for each impulse-like event using rectangular windows.

More specifically, the substitution unit 102 extracts event series including event times and individual response times from the event history stored, for example, in an external database. The substitution unit 102 generates from the extracted event series rectangular windows with a predetermined time interval and a start point that is the time at which the event occurred. Here, the substitution unit 102 generates rectangular windows with different predetermined time intervals.

The substitution unit 102 may substitute rectangular windows for each event (for example, each direct mail transmittal or web advertisement browsing) in a time series (for example, an event series of direct mail transmittals including an advertisement or event series of web advertisement browsing) in which the events are arranged in a time series according to the type of channel. The substitution unit 102 supplies individual response times and rectangular pulse information to the dividing unit 104.

The dividing unit 104 divides a time period including a plurality of events into a plurality of time periods, where at least one element of the rectangular windows varies at each splitting timestamp. For example, the dividing unit 104 divides a time period in an event series into a plurality of time periods at least at the beginning or end of the rectangular windows substituted for the plurality of event series by the substitution unit 102. The dividing unit 104 supplies to the state vector generation unit 106 information on the rectangular windows and divided time periods. In addition, the dividing unit 104 supplies to the response frequency calculation unit 108 information on individual response times and the divided time periods.

The state vector generation unit 106 generates state vectors corresponding to the rectangular-window states for each event series in every divided time period. For example, the state vector generation unit 106 generates a state vector having elements corresponding to each rectangular pulse state in each divided time period.

In one example, the state vector generation unit 106 sets the value of an element corresponding to the state vector at 1 if it is in the active state of the rectangular window which has a value of 1, and sets the value of the element corresponding to the state vector at 0 if it is in the inactive state of the rectangular pulse which has a value of 0. The state vector generation unit 106 supplies the generated state vectors to the analysis unit 110.

The response frequency calculation unit 108 receives an event series and calculates the response frequency for each time period. Here, the response frequency is the number of responses that occurs in a time period. For example, the response frequency calculation unit 108 counts the number of responses during a time period on the basis of whether a response time from an individual occurs within each of the divided time periods. The response frequency calculation unit 108 supplies the calculated number of responses for each time period to the analysis unit 110.

The analysis unit 110 performs a Poisson regression using the state vectors and the number of responses for every divided time period. The analysis unit 110 has a conversion unit 112 and an optimization unit 114.

The conversion unit 112 converts every state vector at each time period to a feature vector using a mapping function. The conversion unit 112 supplies the feature vectors to the optimization unit 114.

The optimization unit 114 optimizes the weight vector to maximize the likelihood with which each observed response frequency is an outcome of a Poisson distribution whose expectation is a product of the time-interval and a scalar score, where each scalar score is the exponential of an inner product of the feature vector and the weight vector. A scalar score represents the likelihood of incurring a response in the future, which is computed with many historical events in a plurality of channels. The weight vector is a vector quantity representing the importance for each element of the feature vector, and may vary by individual.

For example, the optimization unit 114 optimizes the weight vector so that the sum in the time periods is maximized for the logarithm of the likelihood that the number of responses will be generated for the response events recorded in the history from a Poisson process in which the scalar product of a feature vector and a weight vector is treated as the scalar score, and the average response frequency per unit of time is the exponential function of the scalar score. The optimization unit 114 stores the optimized weight vectors in the storage unit 116.

The storage unit 116 stores a weight vector obtained from the optimization unit 114 for each individual. The storage unit 116 may supply weight vectors to the estimation device 20 in response to a request.

In this way, the analysis device 10 divides event series into time periods, generates a state vector for each time period, and optimizes the weight vector to maximize the likelihood with which the expected response frequency will match the response frequency of the history in the Poisson process based on the state vector for each time period and the weight vector. As a result, the analysis device 10 can construct a Poisson process model that takes into account dynamic events.

Also, the analysis device 10 can reduce the computational load, compared to a method in which an event series is discretized into a plurality of fixed-interval periods, by dividing the event series into time periods at transition points in rectangular windows based on events.

The estimating device 20 estimates the response of individuals to the event series using weight vectors for individuals obtained from the results of the analysis performed by the analysis device 10. The estimation device 20 includes a substitution unit 202, state vector generation unit 206, storage unit 208, and estimation unit 210.

The substitution unit 202 substitutes each event in an inputted event series with rectangular windows. For example, the substitution unit 202 inputs an event series that was assumed in a simulation. As in the case of substitution unit 102, this substitution unit 202 generates rectangular windows with a predetermined time interval and with a start point that is the time of an event in the inputted event series. The substitution unit 202 supplies rectangular window information for each event series to the state vector generation unit 206.

The state vector generation unit 206 generates state vectors corresponding to the rectangular window states for each event series in every divided time period. For example, the state vector generation unit 206 divides the time periods included in the plurality of event series by a predetermined time interval.

As in the case of state vector generating unit 106, the state vector generating unit 206 generates a state vector having elements corresponding to each rectangular window state in each divided time period. The state vector generation unit 206 supplies the state vector generated for each time period to the estimation unit 210.

The storage unit 208 receives weight vector information from the storage unit 116 in the analysis device 10, and stores the information. The storage unit 208 supplies the weight vectors to the estimation unit 210.

The estimation unit 210 uses the results of an analysis performed by the analysis device 10 to estimate from the state vectors corresponding to the time periods the response frequency, or number of responses in each time period. First, as in the case of conversion unit 112, the estimation unit 210 converts the state vectors into feature vectors using a mapping function.

Next, the estimation unit 210 calculates a scalar score obtained from the scalar product of the feature vector and weight vector of each time period. The estimation unit 210 uses the Monte Carlo method to simulate a response frequency for each time period from a Poisson distribution in which the product of the exponential function of the scalar score and the length of the time period is used as the expected value. The estimation unit 210 calculates the total response event frequency $y_i$ in all periods of the simulation by calculating the total of all simulated response frequencies. The estimation unit 210 can also calculate the distribution related to the total response event frequency by changing a random number seed and repeating the simulation.

In this way, the estimation device 20 in the present embodiment can estimate the response of individuals to events using weight vectors obtained from the analysis device 10. Also, the estimation device 20 can quantitatively predict the size of the response of many individuals to a future event by performing a simulation on a plurality of individuals.

Figure 2:
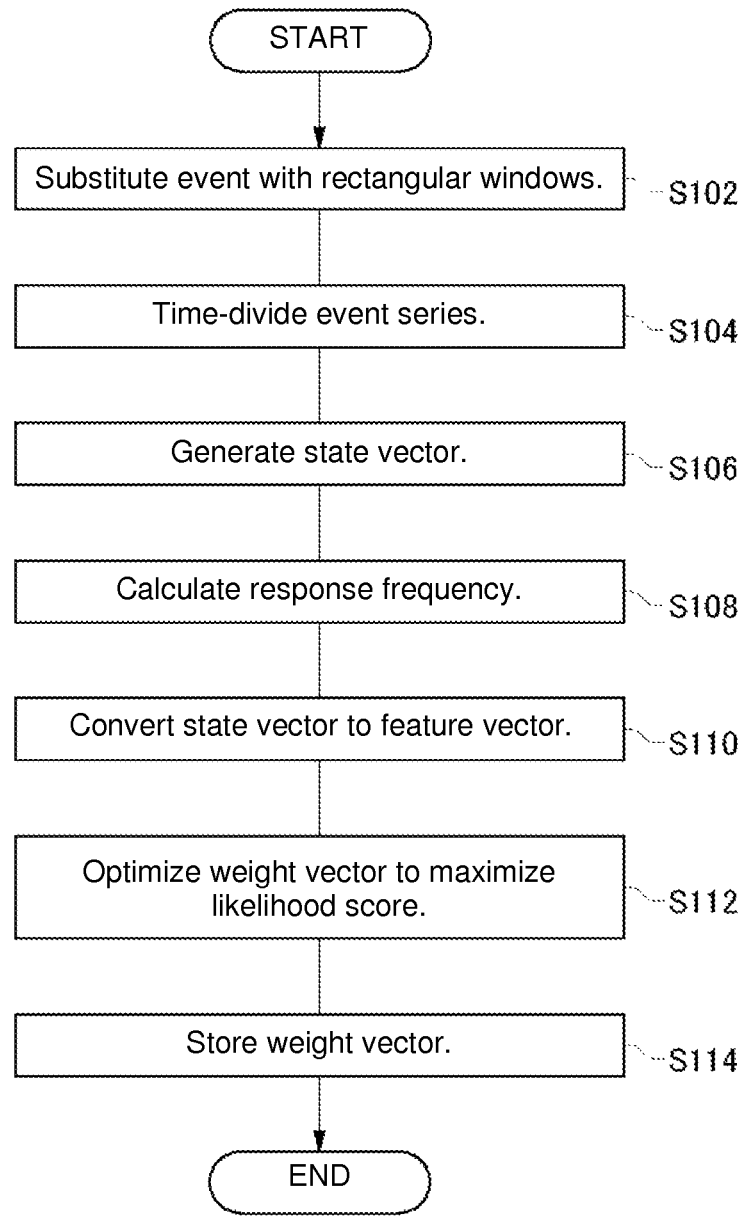
FIG. 2 is a flowchart of the analysis process performed by the analysis device 10 in the present embodiment.

FIG. 2 is a flowchart of the analysis process performed by the analysis device 10 in the present embodiment. In the present embodiment, the analysis device 10 analyzes the response of individuals to an event series in the history by executing the process from Step S102 to Step S114.

First, in Step S102, the substitution unit 102 substitutes each event in an impulse-like event series for a particular individual with rectangular windows. For example, the substitution unit 102 inputs the history of events stored in, for example, a database.

FIG. 3 shows an example of a history of events inputted by the substitution unit 102. The history in FIG. 3 includes the numbers for individuals (ID(i)), and the names of individuals (Name). The history also includes o event series of the $1^{st}$ through the $o^{th}$ events (where o is a natural number), and the response times of individuals.

As shown in FIG. 3, the history includes the time at which direct mail was sent to a customer as the first event series (channel 1) and the time at which a customer browsed a web advertisement as the second event series (channel 2). The history may also include the purchase of a product by a customer as an individual response to the stimulus of an event from a plurality of channels.

For example, the history of ID (i) No. 1 indicates that product advertising was sent by direct mail to Taro Yamada on 2012 Jan. 24 and 2012 Mar. 20 as a first event series, web advertising was browsed by the same person on 2012 Feb. 4 and 2012 Mar. 4 as a second event series, and in response Taro Yamada purchased a product related to the advertising on 2012 Feb. 10.

The substitution unit 102, for example, extracts the times in the first event series and the times in the second event series related to Taro Yamada from the history shown in FIG. 3. The substitution unit 102 generates rectangular pulses of a predetermined time interval with the time of an extracted event as the start point. For example, the substitution unit 102 generates rectangular windows whose lengths are 1 day, 1 week, 2 weeks and 4 weeks with the start point being the time of an event.

Figure 4:
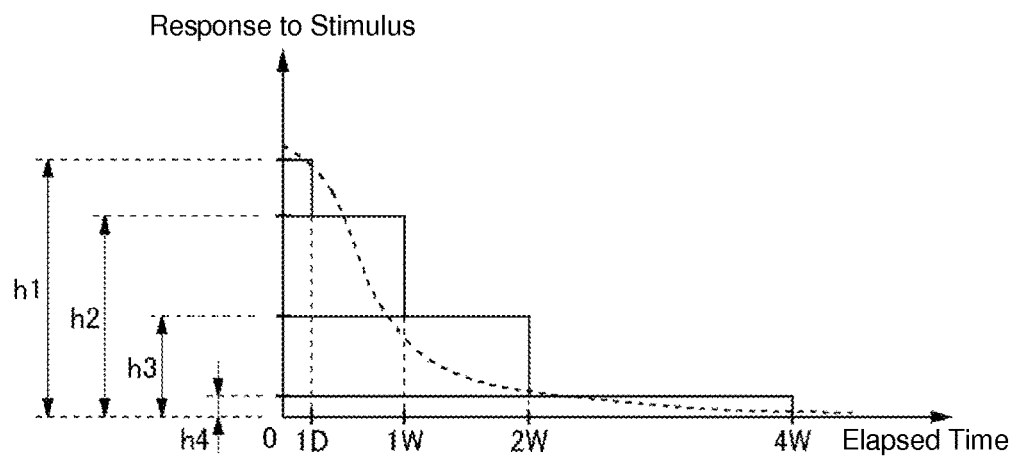
FIG. 4 shows the responses of individuals approximated by rectangular windows.
Figure 4:
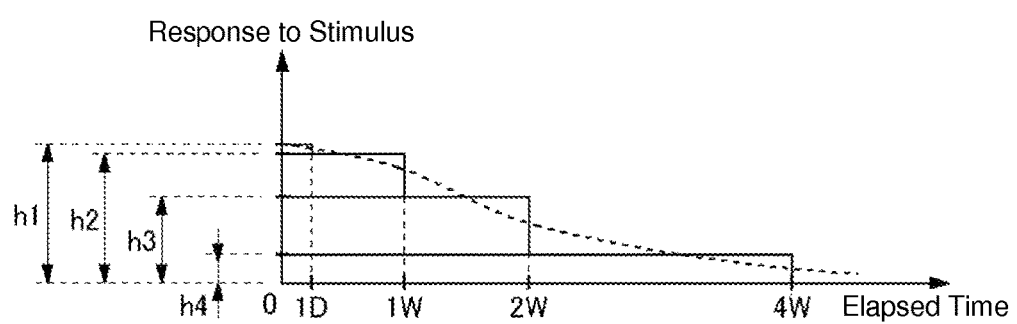

FIG. 4 shows the relationship of individual responses approximated with rectangular windows. In FIG. 4, the curve expressed by a dotted line indicates the true per-time response probability of an individual to a stimulus. As shown in the figure, the response probability is high when individuals respond immediately after the stimulus of an event, and gradually decreases as time passes.

This is because, as an example, individuals forget the event as time passes. For example, when direct mail (DM) is sent to customers, the possibility that a customer will purchase the product related to the DM is high immediately after the DM is received. However, the possibility of a product purchase slowly declines over time because customers gradually forget about the direct mailing (DM).

The absolute strength of a response to stimuli by the same event and the delay aspect to the response also vary by individual. The dotted-line curve in FIG. 4(a) indicates the true per-time response probability of individuals who are sensitive to stimuli, and the dotted-line curve in FIG. 4(b) indicates the true per-time response probability of individuals who are less sensitive to stimuli.

As shown in FIG. 4(a), the response probability immediately after stimulation by an event is high among individuals sensitive to stimuli, and sharply declines after stimulus. Meanwhile, as shown in FIG. 4(b), individuals who are less sensitive to stimuli do not respond very much immediately after stimulation by an event, but continue to respond for a relatively long time after the stimulus.

The solid line in FIG. 4 is the per-time response probability of individuals approximated by rectangular windows. As shown in the figure, the true response curve can be approximated by a staircase function in which the rectangular windows of different time intervals overlap. For example, as shown in FIG. 4(a) and FIG. 4(b), the time intervals of each rectangular window constituting the staircase function are the same for all individuals (1 day, 1 week, 2 weeks, and 4 weeks), but the height h1~h4 of each rectangular window varies by individual. In this way, the true response curves of individuals can be approximated by combining the heights of rectangular windows at predetermined time intervals.

Here, the weight vector $w_i$ of each individual corresponds to the combination of the heights of the rectangular windows of each individual. For example, the $1^{st}$ through $4^{th}$ elements $W_{1\_1}$~$W_{1\_4}$ of the weight vector $w_1$ of the individual whose number is i=1 (Taro Yamada) corresponds to the heights h1~h4 of the rectangular waves for the 1-day, 1-week, 2-week and 4-week time periods approximating the true per-time response probability to individual stimulus.

Figure 5:
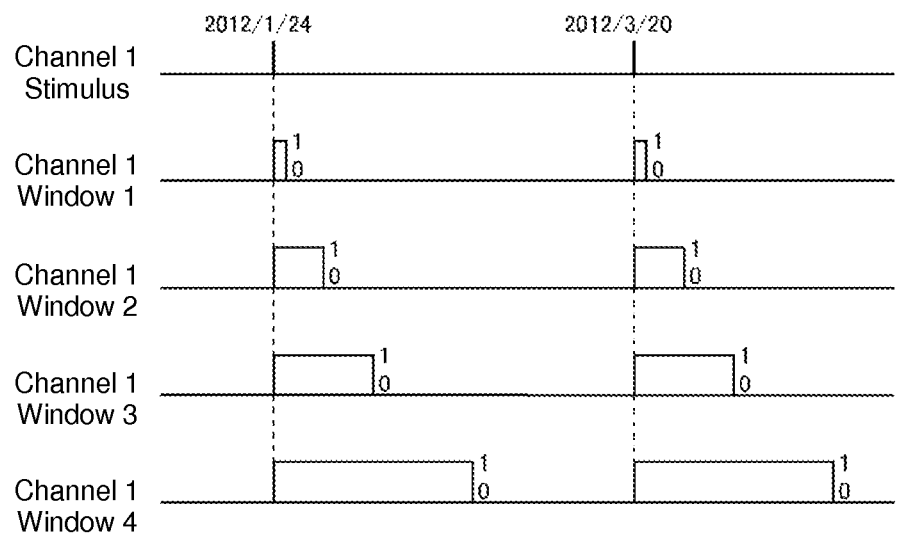
FIG. 5 shows an example of rectangular windows generated by the substitution unit 102.
Figure 5:
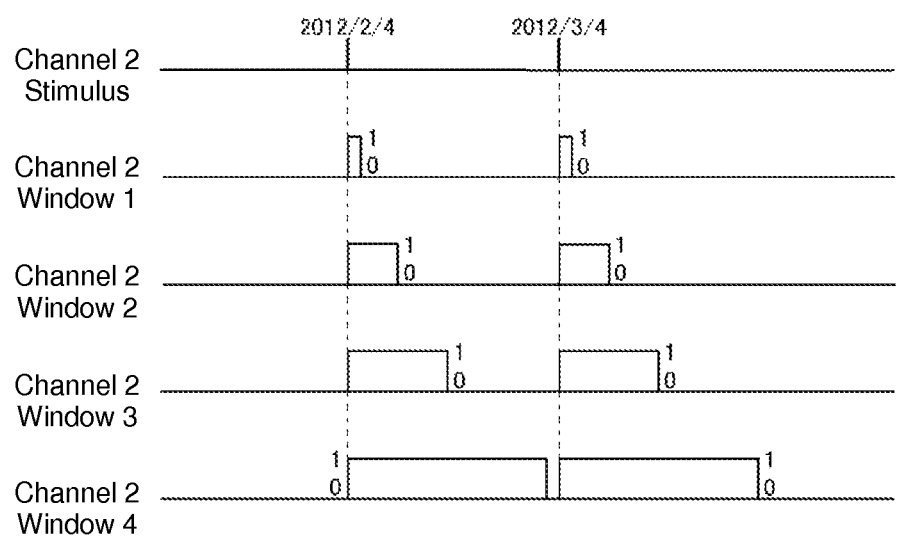

FIG. 5 shows examples of rectangular windows generated by the substitution unit 102 on the basis of the history of Taro Yamada (ID(i)=1) in FIG. 3. The "channel 1 stimulus" and "channel 2 stimulus" impulse-likely indicate the events included in two event series. "Channel 1, windows 1~4" and "channel 2, windows 1~4" indicate the rectangular windows substituted for the events in the event series of the respective channels.

For example, the rectangular windows indicated in "channel 1, window 1" represent two rectangular windows generated with 1-day time intervals starting at the time of the events (2012 Jan. 24 and 2012 Mar. 20) in the event series of channel 1 for Taro Yamada (i=1). Also, the rectangular windows indicated in "channel 2, window 4" represent two rectangular windows generated with 4-week time intervals starting at the time of the events (2012 Feb 4 and 2012 Mar. 4) in the event series of channel 2.

The substitution unit 102 may set the active state to have a value of 1 on the beginning of the rectangular window, and the inactive state to have a value of 0 at the end of the window after the predetermined time interval has elapsed. Alternatively, the substitution unit 102 may assign another integer or real number as the values for the active and inactive states of the rectangular window. Also, when rectangular windows temporarily overlap partially in the same channel and same window, a single value may be calculated as the state value by integrating the value of each rectangular window in the time period according to some criterion. The total value is often used as the criterion, but an OR operation may also be performed using a bit representation. The substitution unit 102 sends to the dividing unit 104 information on a particular individual (such as Taro Yamada in the history shown in FIG. 3) including the response time and the times and values at the start and end of the rectangular windows.

Next, in Step S104, the dividing unit 104 divides the time periods included in the plurality of event series at least at one transition point in the rectangular windows of at least one of the event series.

Figure 6:
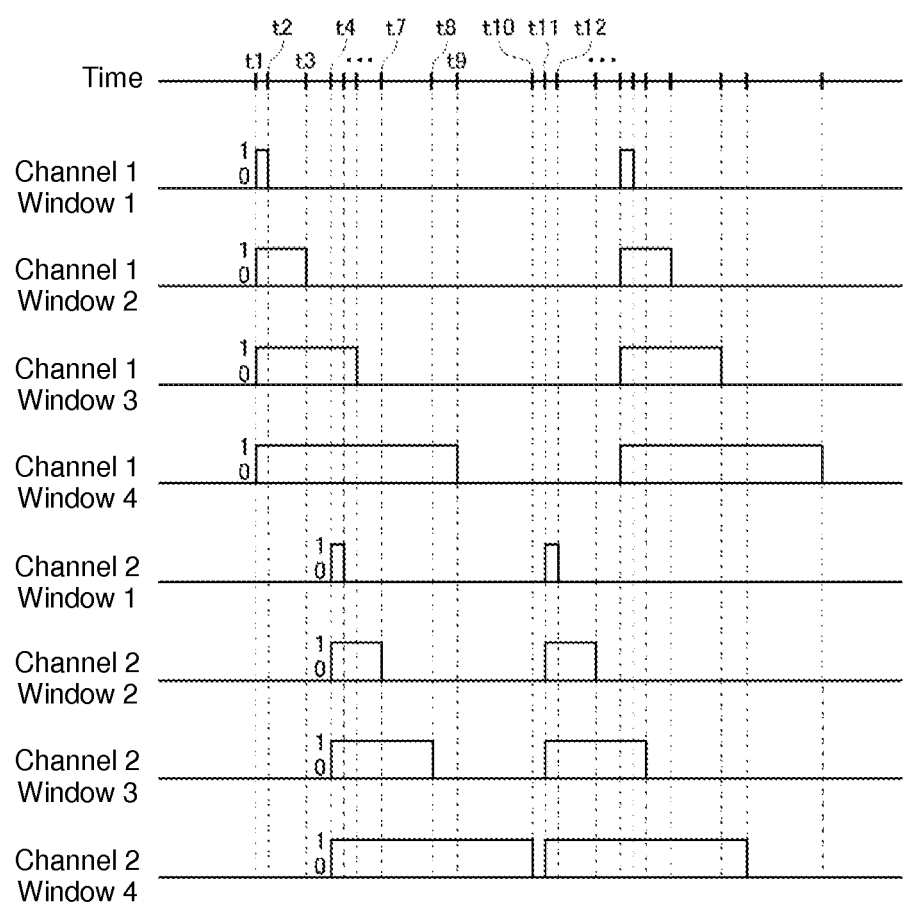
FIG. 6 shows an example of a period of time including an event series divided by a dividing unit 104.

FIG. 6 shows an example of time periods included in an event series divided by the dividing unit 104. As shown in the figure, the dividing unit 104 divides the entire time period included in the event series on the basis of all of the transition points t1, t2, t3 such as beginning timestamps and end timestamps on the rectangular windows generated from the event series in order to obtain time periods adjacent to each other (for example, time period $T_1$ from time t1 to immediately prior to t2, time period $T_2$ from time t2 to immediately prior to t3, time period $T_3$ from time t3 to immediately prior to t4, etc.).

The dividing unit 104 supplies information on the rectangular windows and the divided time periods to the state vector generation unit 106. Also, the dividing unit 104 supplies information on response times and divided time periods to the response frequency calculation unit 108.

Next, in Step S106, the state vector generation unit 106 generates state vectors corresponding to the rectangular windows of each of the event series in each of the divided time periods. For example, the state vector generation unit 106 generates state vector $X_{ij}$ for having a plurality of elements corresponding to the state of the rectangular window in the time period $T_j$ (j=integer) for individual i from time tj to immediately prior to time t(j+1).

Figure 7:
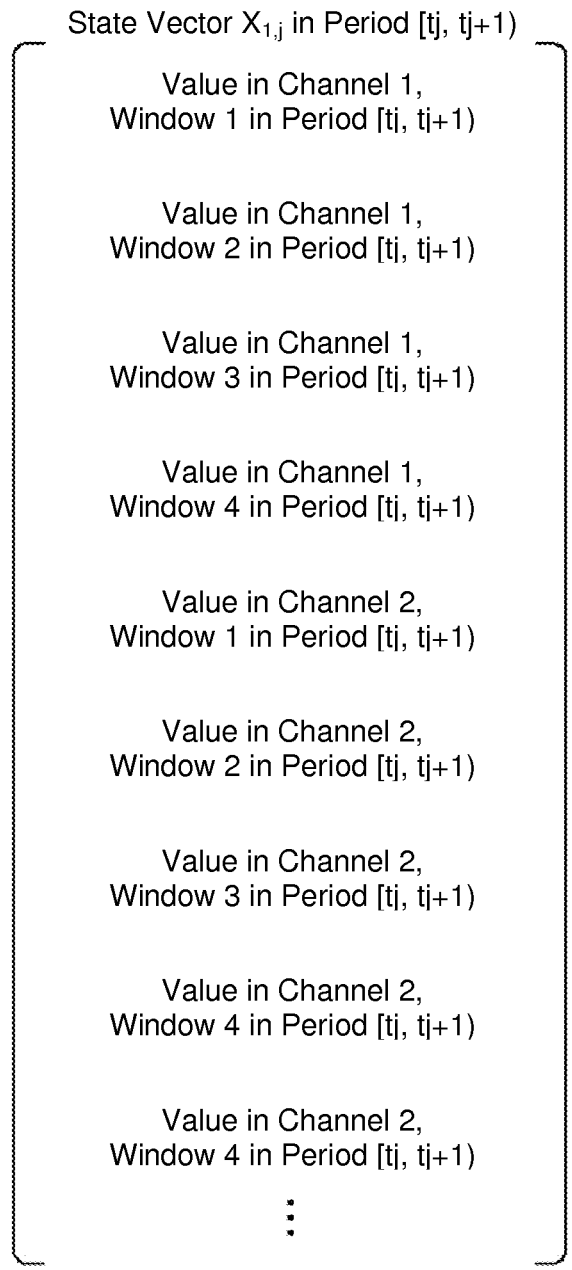
FIG. 7 shows an example of a state vector generated by a state vector generation unit 106.

FIG. 7 shows an example of a state vector generated by the state vector generation unit 106. As shown in the figure, the state vector generation unit 106 generates state vector $X_{1j}$ for individual ID (i)=1 at time period $T_j$ having, as each element at time period $T_j$, the rectangular-window value of channel 1, window 1, the rectangular-window value of channel 1, window 2, the rectangular-window value of channel 1, window 3, the rectangular-window value of channel 1, window 4, the rectangular-window value of channel 2, window 1, the rectangular-window value of channel 2, window 2, the rectangular-window value of channel 2, window 3, and the rectangular-window value of channel 2, window 4.

Figure 8:
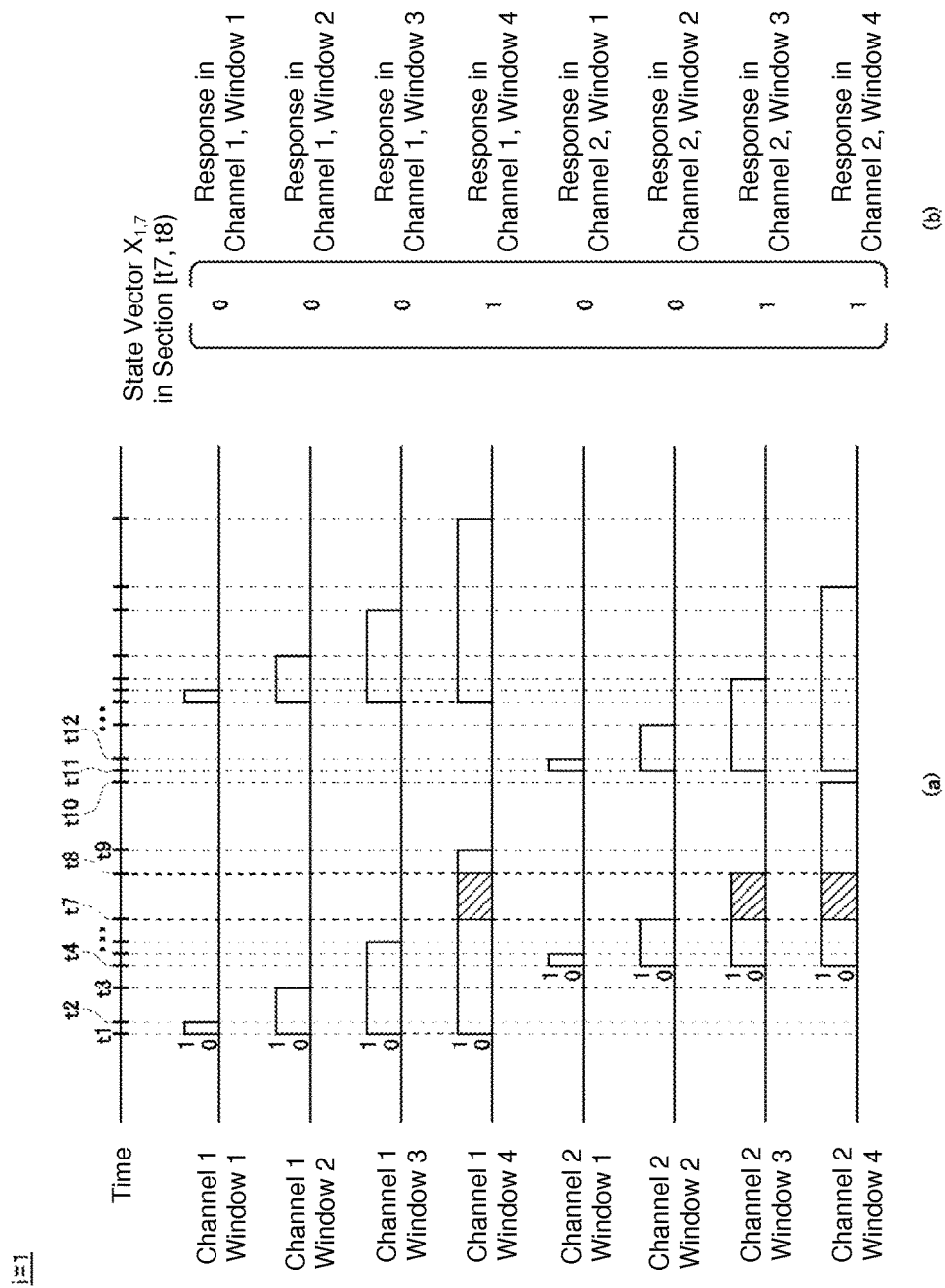
FIG. 8 shows a specific example of a state vector generated by a state vector generation unit 106.

FIG. 8 shows a specific example of a state vector generated by the state vector generation unit 106. FIG. 8(a) shows the event series in FIG. 6, and FIG. 8(b) shows the state vector for the event series in FIG. 8(a) at time period $t_7$ as generated by the state vector generation unit 106.

As shown in the figure, the state vector generation unit 106 generates state vector $X_{1\_7}$ for individual ID (i)=1 in time period $T_7$ from time t7 to immediately prior to t8 including, as elements in time period $T_7$, rectangular-window value (0) in channel 1, window 1, rectangular-window value (0) in channel 1, window 2, rectangular-window value (0) in channel 1, window 3, rectangular-window value (1) in channel 1, window 4, rectangular-window value (0) in channel 2, window 1, rectangular-window value (1) in channel 2, window 2, rectangular-window value (1) in channel 2, window 3, and rectangular-window value (1) in channel 2, window 4. The state vector generation unit 106 supplies the generated state vector $X_{ij}$ to the analysis unit 110.

Next, in Step S108, the response frequency calculation unit 108 receives the event series for each time period and calculates response frequency $y_{ij}$, which is the number of responses generated during time period $T_j$. For example, the response frequency calculation unit 108 counts the number of responses from individual i in each divided time period $T_j$ shown in FIG. 6.

In the example of a history shown in FIG. 3, the response time of individual ID(i)=1 to the event was 2012 Feb. 10, which is included in time period $T_6$ (2012 Feb. 7~2012 Feb. 10) from time $t_6$ (2012 Feb. 7) to immediately prior to time $t_7$ (2012 Feb. 11), which is (2012 Feb. 10). Therefore, the response frequency calculating unit 108 calculates the response frequencies $y_{1\_1}$, $y_{1\_2}$, ..., $y_{1\_5}$, and $y_{1\_7}$, etc. corresponding to time periods $T_1$~$T_5$ as well as time period $T_7$ and thereafter as 0, and calculates the response frequency $y_{1\_6}$ corresponding to time period $T_6$ as 1.

Also, the response frequency calculation unit 108 calculates the lengths of the time periods $\Delta t_{ij}$. For example, the response frequency calculation unit 108 calculates the length $\Delta t_{1\_6}$ of period $T_6$ (2012 Feb. 7~2012 Feb. 10) for individual ID(i)=1 as four days. The response frequency calculation unit 108 supplies the lengths $\Delta t_{ij}$ of each period and the response frequency $y_{ij}$ of each calculated time period to the analysis unit 110.

Next, in Step S110, the conversion unit 112 converts the state vectors $X_{ij}$ into feature vectors. For example, the conversion unit 112 converts the state vectors $X_{ij}$ into the corresponding feature vectors $\Phi(X_{ij})$ using any pre-designed mapping function $\Phi: R^{d1} \rightarrow R^{d2}$. Here, d1 is a dimension of the state vector, and d2 is a dimension of the feature vector. d1 and d2 can be identical.

In one example, the conversion unit 112 can convert the state vectors $X_{ij}$ to feature vectors $\Phi(X_{ij})$ by adding a two-dimensional correlation term to the state vectors $X_{ij}$. In another example, the conversion unit 112 can convert the state vectors $X_{ij}$ to feature vectors $\Phi(X_{ij})$ by applying a degressive function (for example, f(x)=x/(x+a) where a is a constant) to each element in the state vectors $X_{ij}$. Alternatively, the conversion unit 112 can use the unconverted state vectors $X_{ij}$ as the feature vectors $\Phi(X_{ij})$.

Next, in Step S112, the optimization unit 114 optimizes the weight vector so that the likelihood score is maximized. More specifically, the optimization unit 114 first calculates a scalar score, which is the scalar product of the character vector $X_{ij}$ for individual i in each time period j and the weight vector $w_i$. Next, the optimization unit 114 calculates the logarithm of the likelihood with which each observed response frequency is an outcome of a Poisson distribution in which the calculated product of the exponential function of the scalar score and the length of period j is the expected value. Finally, the optimization unit 114 optimizes the weight vector $w_i$ so that the total of the logarithmic likelihood in all time periods has been maximized.

In one example, the optimization unit 114 optimizes the weight vectors $w_{1\sim m}$ for m individuals, where i=1~m by solving the optimization problem in Equation 1. In other words, the analysis unit 110 performs a Poisson regression on the plurality of individuals that are subject to input into the plurality of event series using the optimization unit 114. The optimization unit 114 may use a maximum likelihood estimation, MAP estimation, or Bayesian estimation as the method to solve for Equation 1.

Equation 1

$$\max_{w_0, w_1, \ldots, w_m} \sum_{i=1}^{m} \sum_{j=1}^{n[i]} l(y_{ij}; w_i^T \Phi(x_{ij}), \Delta t_{ij}) - pen(w_0, w_1, w_2 \ldots w_m)$$ Equation 1

The optimization unit 114 uses, as the likelihood function l in Equation 1, a function in which the regularization term for the response frequency is removed from the logarithmic probability mass function based on the probability of an event occurring in the response frequency during a target period in a Poisson process in which the expected value for the number of occurring events per unit of time is an exponential function of the scalar score. The optimization unit 114 can perform the optimization process so as to take into account the irreversibility of time by removing the regularization term.

In one example, the optimization unit 114 uses the function shown in the equation below as the probability function l.
Equation 2

$$l(y;z,\tau) = yz - \tau \exp(z)$$ Equation 2

Here, y is the actual response frequency, z is the scalar score or value of the logarithm related to the expected value for the response frequency, and τ is the length of the target period.

Also, the vector $w_0$ in Equation 1 is the response parameter independent of the individual, and pen ($w_0$, $w_1$, $w_2$, ... $w_m$) is the regularization term. A convex function is typically used, but a non-convex function may also be used as the regularization term. The optimization unit 114 uses the regularization term to avoid overfitting to the history in which weight vectors $w_{1\sim m}$ have been entered, and to prevent the decline of the predictability to different event series.

When a convex regularization term is used, Equation 1 results in a convex optimization problem, so the optimization unit 114 can calculate a global optimization solution using the gradient-based method. In this way, the optimization unit 114 can safely optimize Equation 1.

For example, the optimization unit 114 can use an $L_2$ regularization term as the regularization term for preventing overfitting. In one example, the optimization unit 114 uses the following as the $L_2$ regularization term.
Equation 3

$$pen(w_0, w_1, w_2 \ldots w_m) = c_0 \|w_0\|_2^2 + c \Sigma_{j=1}^{m} \|w_i - w_0\|_2^2$$ Equation 3

Here, $c_0$ and c are hyperparameters determined, for example, using cross-validation. Instead of an $L_2$ regularization term, the optimization unit 114 can use an $L_1$ regularization term. The optimization unit 114 may also use an equation that does not include a regularization term to prevent overfitting.

The optimization unit 114 in the analysis unit 110 may calculate the likelihood function l in Equation 1 by interpolating some of the time periods $T_j$, wherein j=1~n[i]. For example, the optimization unit 114 may compare the time periods $T_j$ to a predetermined reference criterion and interpolate a time period having a length less than the reference among the time periods $T_j$.

For example, the optimization unit 114 may assign the state vector $X_{ix}$ for period $T_x$ to two time periods: time period $T_x$+time period $T_{(x+1)}$. The optimization unit 114 may also assign to time period $T_x$+time period $T_{(x+1)}$ a state vector obtained from the average of state vector $X_{ix}$ for period $T_x$ and state vector $X_{i(x+1)}$ for adjacent time period $T_{(x+1)}$.

Next, in Step S114, the optimization unit 114 stores the optimized weight vectors $w_{1\sim m}$ for m individuals in storage unit 116.

FIG. 9 shows an example of weight vectors $w_{1\sim m}$ stored in a storage unit 116. For example, the storage unit 116 stores values for each element $W_{ie}$ constituting the weight vectors $w_{1\sim m}$ of each individual ID (i). In the example shown here, the storage unit 116 stores four elements $W_{1\_1}$, $W_{1\_2}$, $W_{1\_3}$, and $W_{1\_4}$ that are the elements of the weight vector for Taro Yamada in ID (i)=1. The number of elements constituting the weight vector may be the same as the number of rectangular pulses generated by the substitution unit 102 in Step S102 from a signal event.

In this way, the analysis device 10 of the present embodiment generates a state vector in the process from Step S102 to Step S114 by having the substitution unit 102 substitute an invent in an event series in the history with rectangular windows and having the state vector generation unit 106 generate a state vector. Because the state vectors are steady-state in each time period, the analysis unit 110 in the analysis device 10 can perform a Poisson regression on the weight vectors $w_{1\sim m}$ for m individuals, and the response of each individual to an event can be modeled.

In this way, the analysis unit 10 can approximate the response trend of m individuals to a stimulus using a staircase function composed of rectangular windows. For example, the analysis device 10 can estimate the likelihood of a response from individual i to different types of events and trends such as a time lag in a response to an event by calculating a weight vector $w_i$.

Figure 10:
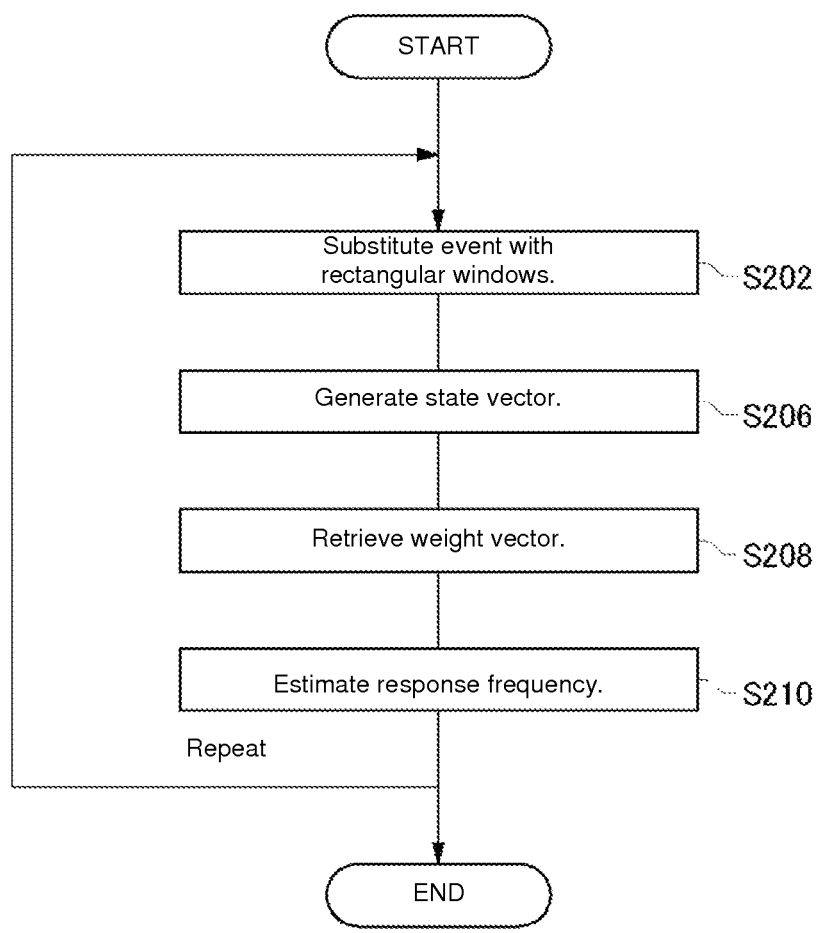
FIG. 10 is a flowchart of the estimation process performed by the estimation device 20 in the present embodiment.

FIG. 10 is a flowchart of the estimation process performed by the estimation device 20 in the present embodiment. In the present embodiment, the estimation device 20 estimates the response of individuals to a predetermined event series by executing the process from Step S202 to Step S210.

First, in Step S202, the substitution unit 202 substitutes each event in an impulse-like event series for a specific individual with rectangular windows. For example, first, the substitution unit 202 inputs an event series assumed in a simulation. In one example, the substitution unit 202 may create an event series for individual i from an existing plan for a product advertising campaign using a predetermined algorithm, and this is inputted.

Next, the substitution unit 202 generates rectangular windows with a predetermined time interval using the time of an event in the event series for individual i as the start point. The substitution unit 202 supplies the information on the plurality of event series, the start points of the rectangular waves, and the time intervals to the state vector generation unit 206.

Next, in Step S206, the state vector generation unit 206 generates a state vector corresponding to the state of the rectangular windows in each of the plurality of time series corresponding to each of the divided time periods. For example, the state vector generation unit 206 first divides the time period in the plurality of event series by a predetermined time interval Δt to generate divided time periods $T_1 \sim T_n$.

The state vector generation unit 206 generates the state vector $X_{ij}$ for individual i in each divided time period $T_j$. In one example, the state vector generation unit 206 generates a state vector $X_{ij}$ from elements corresponding to the state of the rectangular windows at the start point or end point of time period $T_j$. Alternatively, the state vector generation unit 206 may generate a state vector $X_{ij}$ from the average value of the state of the rectangular windows at the start point and end point of time period $T_j$.

The state vector generation unit 206 supplies the generated state vector $X_{ij}$ to the estimation unit 210.

Next, in Step 208, the storage unit 208 retrieves and stores the weight vector $w_i$ for individual i from the storage unit 116 in the analysis unit 10. The storage unit 208 supplies the weight vector $w_i$ to the estimation unit 210.

Next, in Step S210, the estimation unit 210 estimates the response frequency $y_{ij}$ indicating the number of responses from individual i in each of time periods $T_1 \sim T_n$ from the state vectors $X_{i1} \sim X_{in}$ corresponding to the time periods $T_1 \sim T_n$. For example, the estimation unit 210 first converts the state vectors $X_{ij}$ to feature vectors $\Phi(X_{ij})$ using the same method as conversion unit 112.

The estimating unit 210 calculates the scalar score for each time period $T_1 \sim T_n$ obtained from the scalar product if the feature vector $\Phi(X_{ij})$ and the weight vector $w_i$ for individual i. The estimation unit 210 calculates a sample $y_{ij}$ of response frequencies in time period $T_j$ using the Monte Carlo method from a Poisson distribution in which the product of the exponential function of the scalar score and the time interval Δt is the average response frequency in time period $T_j$. When Δt is sufficiently small, 0 or 1 is generated as the response frequency for time period tj.

The estimation unit 210 estimates the response frequency $Y_i$ of individual i in all of the time periods of the event series by calculating the total for the response frequency $y_{ij}$ in time periods $T_1 \sim T_n$. The estimation device 20 repeats the process from Step S202 to Step 210 until a response frequency $Y_i$ has been estimated for all individuals.

In this way, the estimation device 20 in the present embodiment generates status vectors from assumed event series, and uses the scalar product of this and the weight vector $w_i$ indicating the response trend to stimuli for each individual i to simulate the response of each individual i to an event. Thus, the estimating device 20 can quantitatively predict the scale of the response of many individuals to a future event by performing this simulation on a plurality of individuals.

In variations on the embodiment, the estimation unit 210 in the estimation device 20 determines the probability of a response to an event by an individual or the desired period of time before a response instead of estimating the response frequency of an individual to an event.

In the present embodiment, the analysis device 10 determines the response characteristics of an individual i using a weight vector $w_i$. Because weight vectors $w_i$ are used, the estimation device 20 can optimize a marketing strategy by adopting a reinforced learning algorithm and/or Markov decision process.

Also, in the estimating device 20, the state vector generation unit 206 can divide the event series into fixed time intervals. As a result, the estimation device 20 can reduce the computation burden when computing the response frequencies compared to dividing the event series at the transition points in the state vectors.

The analysis device 10 and the estimation device 20 in the present embodiment treat advertising campaigns for a product via direct marketing or web browsing as an event series, and customer purchases as a response to an event. However, the analysis device 10 and the estimation device 20 may use something else as event series and responses. For example, the analysis device 10 and the estimation device 20 may treat a response from an individual via television, email or the telephone as an event. The analysis device 10 and the estimation device 20 may also treat a customer accessing a product website as a response.

Also, the analysis device 10 and the estimation device 20 may include a response to an event itself in an event series. For example, when a customer (individual) purchases a product (response) in response to a direct mail advertisement (event), the analysis device 10 and the estimation device 20 treat the purchase itself as an event relative to the next purchase. In this way, the analysis device 10 and the estimation device 20 can perform modeling when a response by an individual, such as a habitual purchase, is the cause of the next response.

In a variation on the present embodiment, the analysis device 10 and the estimation device 20 may analyze and estimate the dissemination of information in a social network. For example, the analysis device 10 and the estimation device 20 sort text posted to a short message service (SMS) into predetermined topics, and treat posts on different topics as events with different channels.

Also, the analysis device 10 and the estimation device 20 may treat a post that is a continuation of another post as a response to an event. In this way, the analysis device 10 and the estimation device 20 can analyze and predict the dissemination of information in a social network.

Figure 11:
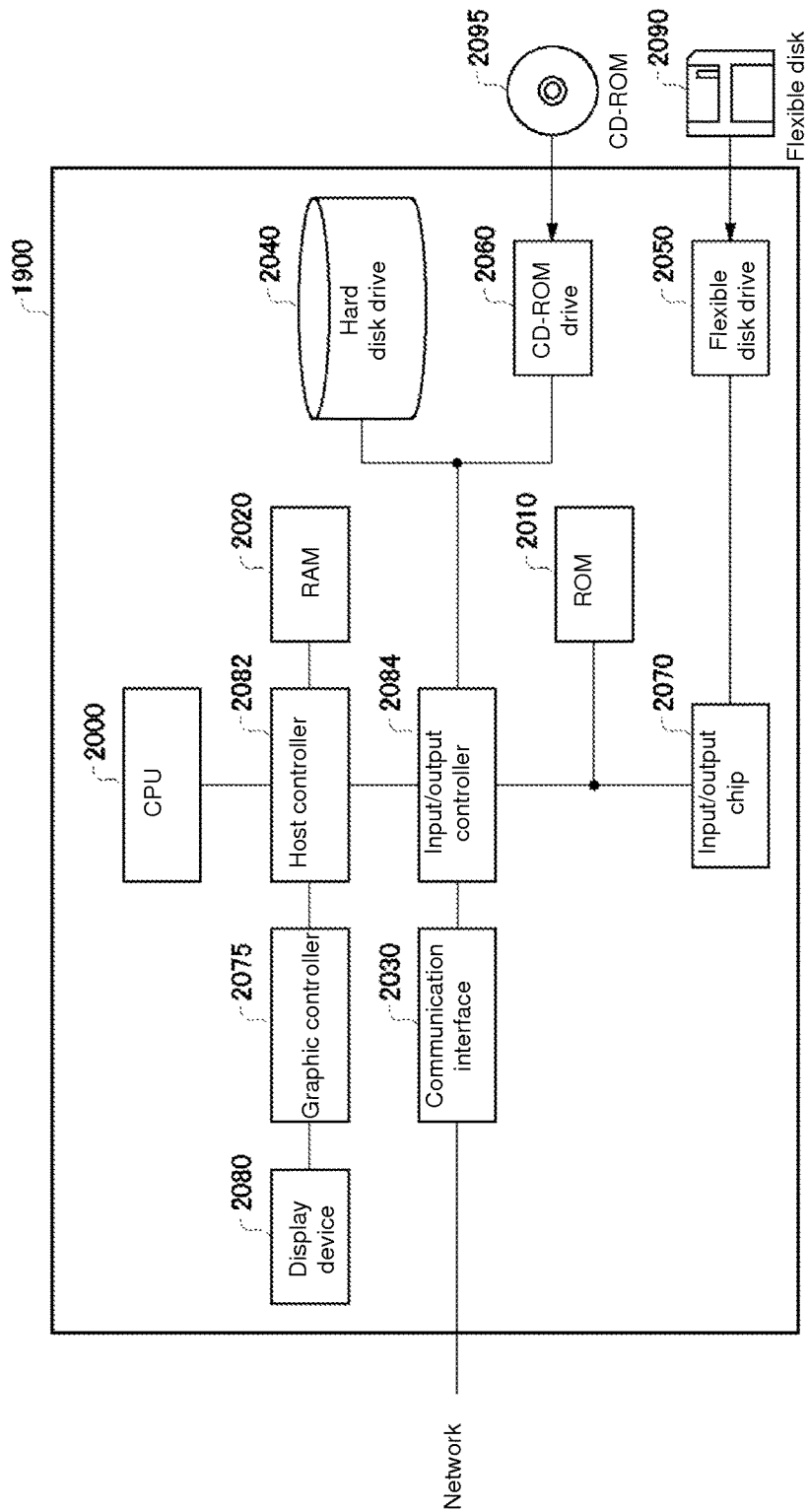
FIG. 11 shows an example of a hardware configuration for a computer 1900.

FIG. 11 shows an example of a hardware configuration for the computer 1900 serving as the analysis device 10 and estimation device 20 in the present embodiment. The computer 1900 in the present embodiment is equipped with a CPU peripheral portion having a CPU 2000, RAM 2020, graphics controller 2075 and display device 2080 connected to each other by a host controller 2082, an input/output portion having a communication interface 2030, a hard disk drive 2040 and a CD-ROM drive 2060 connected to the host controller 2082 by an input/output controller 2084, and a legacy input/output portion having a ROM 2010, flexible disk drive 2050, and input/output chip 2070 connected to the input/output controller 2084.

The host controller 2082 is connected to RAM 2020, a CPU 2000 accessing the RAM 2020 at a high transfer rate, and a graphics controller 2075. The CPU 2000 is operated on the basis of a program stored in the ROM 2010 and the RAM 2020, and controls the various units. The graphics controller 2075 acquires the image data generated in the frame buffer of the RAM 2020 by the CPU 2000 and other units, and displays this image data on the display device 2080. Alternatively, the graphics controller 2075 can include a frame buffer for storing image data generated by the CPU 2000 and other units.

The input/output controller 2084 is connected to a host controller 2082, a communication interface 2030 serving as a relatively high-speed input/output device, a hard disk drive 2040, and a CD-ROM drive 2060. The communication interface 2030 communicates with the other devices via a wired or wireless network. The communication interface also functions as hardware for communicating with the outside. The hard disk drive 2040 stores the programs and data used by the CPU 2000 in the computer 1900. The CD-ROM drive 2060 reads programs and data from the CD-ROM 2095 and provides them to the hard disk drive 2040 via the RAM 2020.

The input/output controller 2084 is connected to the ROM 2010, the flexible disk drive 2050, and the relatively low-speed input/output device of the input/output chip 2070. The ROM 2010 stores the boot program executed by the computer 1900 at startup and/or programs relying on hardware in the computer 1900. The flexible disk drive 2050 reads programs or data from a flexible disk 2090, and provides the programs and data to the hard disk drive 2040 via the RAM 2020. The input/output chip 2070 connects the flexible disk drive 2050 to the input/output controller 2084, and various types of input/output device are connected to the input/output controller 2084 via a parallel port, serial port, keyboard port, or mouse port, etc.

A program provided to the hard disk drive 2040 via the RAM 2020 is stored on a recording medium such as a flexible disk 2090, CD-ROM 2095 or IC card, and provided by the user. A program is read from the recording medium, installed in the hard disk drive 2040 inside the computer 1900 via the RAM 2020, and executed by the CPU 2000.

Programs installed in the computer 1900 to enable the computer 1900 to function as an analyzing device 10 include a substitution module, dividing module, state vector generation module, response frequency calculation module, analysis module, conversion module, optimization module, and storage module. These programs or modules may be activated by the CPU 2000 to enable the computer 1900 to function as a substitution unit 102, dividing unit 104, state vector generation unit 106, response frequency calculation unit 108, analysis unit 110, conversion unit 112, optimization unit 114, storage unit 116, substitution unit 202, state vector generation unit 206, storage unit 208, and estimation unit 210.

The information processing steps written in these programs are specific means activated by reading the programs to the computer 1900 so that the software cooperates with the various types of hardware resources described above. These specific means function as a substitution unit 102, dividing unit 104, state vector generation unit 106, response frequency calculation unit 108, analysis unit 110, conversion unit 112, optimization unit 114, storage unit 116, substitution unit 202, state vector generation unit 206, storage unit 208, and estimation unit 210. These specific means realize operations and the processing of information in the computer 1900 of the present embodiment to construct an analyzing device 10 and an estimation device 20 for this intended purpose.

For example, when the computer 1900 communicates with an external device, the CPU 2000 executes the communication program loaded in the RAM 2020, and instructs the communication interface 2030 in the communication processing on the basis of the processing content described in the communication program. The communication interface 2030 is controlled by the CPU 2000, and reads the transmitted data stored in the transmission buffer region of a memory device such as the RAM 2020, hard disk drive 2040, flexible disk 2090 or CD-ROM 2095, or writes reception data received from the network to a reception buffer region of the storage device. In this way, the communication interface 2030 transfers transmitted and received data to the storage device using the DMA (Direct Memory Access) method. Alternatively, the CPU 2000 transfers transmitted and received data by reading data from the source storage device or communication interface 2030, and transfers and writes data to the destination communication interface 2030 or storage device.

Also, the CPU 2000 writes all of the data or the necessary data to the RAM 2020 via, for example, a DMA transfer, from files or databases stored in an external storage device such as a hard disk drive 2040, a CD-ROM drive 2060 (CD-ROM 2095) or a flexible disk drive 2050 (flexible disk 2090), and performs various types of processing on the data in the RAM 2020. The CPU 2000 then writes the processed data to the external storage device via, for example, a DMA transfer. Because the RAM 2020 temporarily stores the contents of the external storage device during this process, the RAM 2020 and the external storage device are generally referred to in the present embodiment as memory, a storage unit, or a storage device. These may correspond to storage unit 116 and storage unit 208 in the present embodiment.

The various types of information in the various types of programs, data, tables and databases of the present embodiment are stored in these memory devices, and are the targets of information processing. The CPU 2000 can hold some of the RAM 2020 in cache memory, and read and write data to the cache memory. Here, the cache memory performs some of the functions of the RAM 2020. Therefore, this division is excluded in the present embodiment. Cache memory is included in the RAM 2020, the memory, and/or the storage device.

The CPU 2000 also performs various types of processing on data read from the RAM 2020 including the operations, processing, condition determination, and information retrieval and substitution described in the present embodiment and indicated by a sequence of instructions in the program, and writes the results to the RAM 2020. For example, when performing a condition determination, the CPU 2000 compares various types of variables described in the present embodiment to other variables or constants to determine whether or not conditions such as greater than, less than, equal to or greater than, equal to or less than or equal to have been satisfied. When a condition has been satisfied (or not satisfied), the process branches to a different sequence of instructions or calls up a subroutine.

The CPU 2000 can also retrieve information stored in files and databases inside the memory device. For example, when a plurality of entries associating an attribute value for a second attribute to an attribute value for a first attribute, the CPU 2000 can retrieve an entry matching the conditions indicated by the attribute value of the first attribute among the plurality of entries stored in the storage device, and then obtaining the attribute value of the second value associated with the first value satisfying a predetermined condition by reading the attribute value of the second attribute stored in the entry.

A program or module described above can be stored in a recording medium of an external unit. Instead of a flexible disk 2090 or a CD-ROM 2095, the recording medium can be an optical recording medium such as a DVD or CD, a magneto-optical recording medium such as MO, a tape medium, or a semiconductor memory such as an IC card. The recording medium can also be a storage device such as a hard disk or RAM provided in a server system connected to a dedicated communication network or the internet, and the program can be provided to the computer 1900 via the network.

The present invention was explained using an embodiment, but the technical scope of the present invention is not limited to the embodiment described above. The possibility of many changes and improvements to this embodiment should be apparent to those skilled in the art. Embodiments including these changes and improvements are within the technical scope of the present invention, as should be clear from the description of the claims.

The order of execution for operations, steps and processes in the devices, systems, programs and methods described in the claims, description and drawings was described using such terms as "previous" and "prior". However, these operations, steps and processes can be realized in any order as long as the output of the previous process is used by the subsequent process. The operational flow in the claims, description and drawing were explained using terms such as "first" and "next" for the sake of convenience. However, the operational flow does not necessarily have to be executed in this order.

REFERENCE SIGNS LIST

10: Analysis device
20: Estimation device
102: Substitution unit
104: Dividing unit
106: State vector generation unit
108: Response frequency calculation unit
110: Analysis unit
112: Conversion unit
114: Optimization unit
116: Storage unit
202: Substitution unit
206: State vector generating unit
208: Storage unit
210: Estimation unit
1900: Computer
2000: CPU
2010: ROM
2020: RAM
2030: Communication interface
2040: Hard disk drive
2050: Flexible disk drive
2060: CD-ROM drive
2070: Input/output chip
2075: Graphics controller
2080: Display device
2082: Host controller
2084: Input/output controller
2090: Flexible disk
2095: CD-ROM

The invention claimed is:

1. An analysis device for determining a scale of a response of one or more individuals to a future event, said device comprising:
  a memory;
  one or more processor devices associated with the memory, said one or more processor devices configured to:
    receive data representing a history of events associated with an individual, said history of events arranged in a time series over a period of time;
    substitute each event in each of the one or more event time series with rectangular windows of predetermined time width;
    divide the event series timewise according to transition points corresponding to beginning timestamps and end timestamps associated with each of the rectangular windows to obtain multiple adjacent time periods;
    generate a state vector corresponding to the state of the rectangular windows in each of the multiple adjacent time periods;
    calculate a response frequency for each time period, the response frequency being the number of responses generated during the time period;
    convert the state vectors to feature vectors;
    perform a Poisson regression using the state vectors and the response frequencies corresponding to the time periods,
    optimize a weight vector to maximize a likelihood with which response frequencies can be obtained in the time periods from a Poisson distribution on the basis of a scalar score obtained from the scalar product of the feature vectors and the weight vector,
    store in the memory, the optimized weight vector for the individual; and
    determine a response characteristic of the individual to a future event series using the stored weight vector.

2. The analysis device according to claim 1, wherein the one or more processor devices are further configured to: optimize the weight vector to maximize the totals in the time periods from a likelihood function for calculating the probability of occurrence of the response frequency on the basis of the scalar score.

3. The analysis device according to claim 2, wherein the one or more processor devices are further configured to: use, as the likelihood function, a sum of a regularization term for the weight vectors and a logarithmic probability mass function used to calculate the probability of an event occurring in the response frequency during a target period in a Poisson process, in which the average event frequency per unit of time is an exponential function of the scalar score.

4. The analysis device according to claim 2, wherein the one or more processor devices are further configured to: use the likelihood function expressed according to:

$$l(y;z,\tau)=yz-\tau\exp(z) \qquad \text{Equation 1}$$

where y is the response frequency, z is the scalar score, and τ is the length of the target period.

5. The analysis device according to claim 1, wherein the analysis unit performs a Poisson regression on each of the individuals subject to input into the plurality of event series.

6. The analysis device according to claim 1, wherein the analyzing unit decimates some of the time periods.

7. The analysis device according to claim 6, wherein the analysis unit decimates the time periods having a length less than the reference.

8. An estimation device for estimating a response to an event series on the basis of results of an analysis performed by the analysis device according to claim 1, the estimation device comprising:
  a memory;
  one or more processor devices associated with the memory, said one or more processor devices configured to:
    substitute each event in the inputted event series with rectangular pulses;

generate a state vector corresponding to the state of the rectangular windows in response to each of the time periods; and estimate the response frequency indicating the number of responses corresponding to each of the time periods from the state vectors corresponding to each of the time periods using the results of the analysis performed by the analysis device.

9. A computer program product for determining a scale of a response of one or more individuals to a future event, the computer program product comprising a non-transitory computer readable storage medium having program instructions embodied therewith, the program instructions executable by a processor to perform a method comprising:

inputting data representing a history of events associated with an individual, said history of events arranged in a time series over a period of time;

substituting each event in the inputted event time series with rectangular windows of predetermined time width;

dividing the event series timewise according to transition points corresponding to beginning timestamps and end timestamps associated with each of the rectangular windows to obtain multiple adjacent time periods;

generating a state vector corresponding to the state of the rectangular windows in each of the multiple adjacent time periods;

calculating a response frequency for each time period, the response frequency being the number of responses generated during the time period;

converting the state vectors to feature vectors;

performing a Poisson regression using the state vectors corresponding to the time periods, optimizing a weight vector to maximize a likelihood with which response frequencies can be obtained in the time periods from a Poisson distribution on the basis of a scalar score obtained from the scalar product of the feature vectors and the weight vector, storing in the memory, the optimized weight vector for the individual; and determining a response characteristic of the individual to a future event series using the stored weight vector.

10. The computer program product according to claim 9, comprising further program instructions executable by the processor to configure the processor to perform:

substituting each event in the inputted event series with rectangular windows;

generating a state vector corresponding to the state of the rectangular windows in response to each of the time periods; and estimating the response frequency indicating the number of responses corresponding to each of the time periods from the state vectors corresponding to each of the time periods using the results of the analysis performed by the analysis device.

11. An analyzing method for determining a scale of a response of many individuals to a future event, said method comprising the computer-executable steps of:

receiving, using a processor, data representing a history of events associated with an individual, said history of events arranged in a time series over a period of time;

substituting, using the processor, each event in each of the received one or more event time series with rectangular windows of pre-determined time width;

dividing, using the processor, the event series timewise according to transition points corresponding to beginning timestamps and end timestamps associated with each of the rectangular windows to obtain multiple adjacent time periods;

generating, using the processor, a state vector corresponding to the state of the rectangular windows in each of the multiple adjacent time periods;

calculating, using the processor, a response frequency for each time period, the response frequency being the number of responses generated during the time period;

converting, using the processor, the state vectors to feature vectors;

performing, using the processor, a Poisson regression using the state vectors and the response frequencies corresponding to the time periods; and optimizing, using the processor, a weight vector to maximize the likelihood with which response frequencies can be obtained in the time periods from a Poisson distribution on the basis of a scalar score obtained from the scalar product of the feature vectors and the weight vector;

storing in the memory, the optimized weight vector for the individual; and determining, using the processor, a response characteristic of the individual to a future event series using the stored weight vector.

12. The analysis method according to claim 11, wherein in the Poisson regression step, a Poisson regression is performed on each of the individuals subject to input into the plurality of event series.

13. The analysis method according to claim 11, wherein some of the time periods are decimated in the Poisson regression step.

14. An estimation method for estimating a response to an event series on the basis of the results of the analysis of the analysis method according to claim 11, the estimating method comprising:

a computer substituting each event in the inputted event series with rectangular pulses;

a computer generating a state vector corresponding to the state of the rectangular windows in response to each of the time periods; and a computer estimating the response frequency indicating the number of responses corresponding to each of the time periods from the state vectors corresponding to each of the time periods using the results of the analysis performed by the analysis method.

* * * * *